United States Patent
Puthiyandyil et al.

(10) Patent No.: US 6,763,018 B1
(45) Date of Patent: Jul. 13, 2004

(54) DISTRIBUTED PROTOCOL PROCESSING AND PACKET FORWARDING USING TUNNELING PROTOCOLS

(75) Inventors: Sanil Kumar Puthiyandyil, Schaumburg, IL (US); Matthew H. Harper, Arlington Heights, IL (US); Ching Kung, Mt. Prospect, IL (US); Shaji Radhakrishnan, Des Plaines, IL (US); Rajesh Ramankutty, Schaumburg, IL (US)

(73) Assignee: 3COM Corporation, Marlborough, MA (US)

( * ) Notice: Subject to any disclaimer, the term of this patent is extended or adjusted under 35 U.S.C. 154(b) by 805 days.

(21) Appl. No.: 09/728,282

(22) Filed: Nov. 30, 2000

(51) Int. Cl.[7] .................... H04L 12/66; H04L 12/28; H04J 3/16
(52) U.S. Cl. .................... 370/352; 370/355; 370/401; 370/469; 375/222
(58) Field of Search .................... 370/352, 355, 370/389, 401, 469, 466, 467; 375/322; 709/203, 208, 219, 229, 230

(56) References Cited

U.S. PATENT DOCUMENTS

| | | | |
|---|---|---|---|
| 5,528,595 A | 6/1996 | Walsh et al. | 370/85.13 |
| 5,878,040 A | 3/1999 | Peirce, Jr. et al. | 370/389 |
| 5,918,019 A * | 6/1999 | Valencia | 395/200.57 |
| 6,009,101 A | 12/1999 | Schoo et al. | 370/400 |
| 6,304,574 B1 | 10/2001 | Schoo et al. | 370/401 |
| 6,373,838 B1 * | 4/2002 | Law et al. | 370/352 |
| 6,449,272 B1 * | 9/2002 | Chuah et al. | 370/389 |
| 6,711,742 B1 * | 3/2004 | Kishi et al. | 725/111 |

FOREIGN PATENT DOCUMENTS

| WO | WO 9926387 | 5/1999 |
|---|---|---|

OTHER PUBLICATIONS

Request for Comments (RFC) 2661, *Layer Two Tunneling Protocol "L2TP"*, W. Townsley et al., dated Aug. 1999.

* cited by examiner

*Primary Examiner*—Duc Ho
(74) *Attorney, Agent, or Firm*—McDonnell Boehnen Hulbert & Berghoff LLP

(57) ABSTRACT

A high density network access server implements a tunneling protocol between a modem module and a route server module. PPP and routing control packets received from the PPP link are tunneled to the route server for processing. The IP data packet forwarding function for the network access server is distributed directly to the modem modules. The combination of distributed PPP processing and distributed IP data packet forwarding enables the capacity of the network access server to be scaled to orders of magnitude greater than previously known, to handle thousands or even tens of thousands of simultaneous data sessions.

21 Claims, 5 Drawing Sheets

DISTRIBUTED PROTOCOL PROCESSING AND PACKET FORWARDING USING TUNNELING PROTOCOLS

BACKGROUND OF THE INVENTION

A. Field of the Invention

This is a telecommunications invention that relates generally to the field of remote access to packet switched networks over point to point links. More particularly, the invention relates to a network access server and method for performing distributed processing of the Point-to-Point Protocol (PPP) and distributed packet forwarding of Internet Protocol (IP) packets using a tunneling protocol, such as the Layer 2 Tunneling Protocol (L2TP). The invention is particularly suitable for use in a high density remote access server, such as a remote access server simultaneously connecting a large number of remotely located users to a packet switched network, e.g., the Internet.

B. Description of Related Art

The methods and techniques disclosed herein can be performed by an element of communications equipment referred to herein as a "network access server", also known as a "remote access server." A network access server is a device that is capable of receiving a plurality of simultaneous incoming calls from remote users via a circuit switched network, such as the Public Switched Telephone Network (PSTN), and routing them to a packet switched computer network, such as a corporate backbone network, or Internet, for transmission to a host computer system or other device connected to the computer network. The network access server is also capable of handling multiple simultaneous calls from the computer network and directing them onto the PSTN for transmission to the remote user.

The patent to Dale M. Walsh et al., U.S. Pat. No. 5,528,595, which is fully incorporated by reference herein, describes a network access server. The network access server of the Walsh et al. patent has been commercialized widely by 3Com Corporation (previously U.S. Robotics Corp.) under the trade designation Total Control™ Enterprise Network Hub. Network access servers similar in functionality, architecture and design are available from other companies, including Ascend Communication, Lucent Technologies, and others. The invention is suitable for implementation in network access servers from the above companies, and other similar devices.

Typically, the individual remotely located users dial in to the remote access server over a public switched telephone network, cable modem network, ADSL connection, wireless network connection, or other type of communications link. Part of the connection process is the establishment of a Point-to-Point Protocol connection between the remote user's modem and the remote access server.

Industry and international standards bodies have established sets of functional requirements, conventions or rules that govern the transmission of data over circuit switched and packet switched computer networks. These functional requirements or rules are known in the art as "protocols." The implementation of protocols is necessary in order to bring order, and standardization, to the communications field and allow equipment of diverse manufacturers to interoperate. Some protocols are considered low level transmission media related protocols, such as modulation schemes implemented in a modem, for example V.34, V.90, etc. Other protocols are considered higher level, as they relate to functions performed at higher levels in the OSI model, and are concerned with such features as error control, transmission control protocols and network level routing and encapsulation of data.

The requirements of these latter protocols are typically prepared as an International Engineering Task Force "Request For Comment" (RFC) document, circulated among the industry and eventually adopted by the standards bodies. Sometimes, they are introduced prior to formal approval by a standards body and adopted by players in the industry, becoming de facto standards. The present invention is concerned with the distributed processing of these higher-level network control protocols, and in particular the Point-to-Point Protocol (PPP). The PPP is well known in the art and described in RFC 1661, the contents of which are incorporated by reference herein.

Briefly, the PPP describes an encapsulation mechanism for transporting muliprotocol packets across layer 2 point-to-point links. Typically, a user obtains a OSI-model layer 2 (i.e., data link layer) connection to a network access server using a number of techniques (dialing up over the PSTN, over an ISDN line, over an ADSL connection, etc.) and then runs PPP over that connection. In such a connection, the layer 2 termination point and the PPP session endpoint reside on the same physical device, namely the network access server on one side and the remote user's modem on the other side.

The patent to Daniel L. Schoo, et al., U.S. Pat. No. 6,009,101, the contents of which are incorporated by reference herein, describes a method by which the processing of the PPP is distributed among multiple computing platforms in the network access server, in order to increase the efficiency and throughput of the network access server. A first portion of the processing is performed in the modem digital signal processor (DSP) of the network access server, and the remainder of the processing is performed in the gateway computing platform, e.g., DSP or general purpose computing platform in the routing card in the network access server.

Tunneling protocols, by which frames of data are routed from one node to another on a network, are also known in the art. One of these tunneling protocols that can be used with the invention is the Layer 2 Tunneling Protocol or L2TP, which is described in RFC 2661, the contents of which are incorporated by reference herein. Persons skilled in the art are familiar with the contents of RFC 2661. The L2TP protocol describes a mechanism for tunneling PPP packets across an intervening network in a way that is transparent to both end users and applications. The L2TP extends the PPP model by allowing the layer 2 and PPP endpoints to reside on different devices interconnected by a packet switched network. With L2TP, a user has a layer 2 connection to an access concentrator (e.g., modem bank, or an ADSL Digital Subscriber Line Access Multiplexer or DSLAM), and the concentrator then tunnels the individual PPP frames to a remotely located remote access server over an IP network. This allows the actual processing of the PPP frames to be divorced from the termination of the layer 2 circuit.

One benefit of L2TP is that the separation between the processing of PPP frames and termination of the layer 2 circuit can avoid long distance telephone charges. The layer 2 connection may be a local call to a local switched circuit concentrator, which then extends the logical PPP session over a shared infrastructure such as a frame relay circuit or the Internet to the PPP terminating unit, which can be located anywhere. From the user's perspective, there is no perceptible difference in having the layer 2 circuit terminate and PPP processing occur in a network access server directly, or the PPP frames processed in a remotely located remote access server using L2TP.

The distributed PPP processing techniques of the Schoo patent, and the off-loading of PPP processing entirely as described in L2TP are, in and of themselves, insufficient mechanisms for handling the processing requirements of next-generation, ultra-high capacity network access servers. The market is demanding that such devices meet performance, throughput, and high availability requirements that are orders of magnitude above what was typically provided for only a few years ago. This phenomenon is a result of the explosive growth in the Internet, and the need for Internet Service Providers to install remote access servers that can keep up with the demand for Internet access. These next-generation network access servers are being designed to handle thousands, and even tens of thousands of PPP sessions simultaneously in a single chassis.

The present invention provides a method and network access server architecture in which high speed Internet Protocol data forwarding is separated from control, route calculation and other configurations overhead using a tunneling protocol, within the network access server itself. It permits ultra-high capacity network access servers to meet the performance and availability requirements that the market demands, while enabling the processing of thousands or tens of thousands of PPP sessions at the same time. Moreover, the invention uses an existing tunneling protocol, albeit with slight modification. This allows for reuse of existing expertise and source code in the tunneling art for achieving this goal instead of developing a tunneling protocol from scratch.

SUMMARY OF THE INVENTION

In a first aspect of the invention, a method is provided for distributing the processing of Point-to-Point Protocol frames and distributed Internet Protocol packet forwarding in a network access server. The network access server provides simultaneous access to a packet switched network for a plurality of remote terminals connected to a first network, such as a circuit switched network like the Public Switched Telephone Network. The network access server also includes an egress or interface module providing an interface to the packet switched network.

The method includes the step of providing a tunneling protocol access concentrator function in a modem module in the network access server. The tunneling protocol access concentrator function in the illustrated embodiment is as L2TP Access Concentrator (LAC), similar to that described in the RFC 2661 specification. The LAC acts as one side or node of a L2TP tunnel endpoint. The network access server also has a route server processing module. The route server has software and hardware implementing a tunneling protocol network server function, i.e., a peer to the LAC function in the modem module. The tunneling protocol network server function in the illustrated embodiment is a L2TP Network Server (LNS). The LAC function in the modem module tunnels PPP control packets, e.g., link negotiation and authentication packets, and PPP packets with IP routing control data (such as IP RIP data and Internet Protocol Control Protocol (IPCP) data) to the route server LNS for termination. The route server module performs IP routing and PPP control functions for the PPP frames received from the modem module.

The modem module further includes a distributed forwarding module, preferably operating under instruction from the LNS function in the route server. The distributed forwarding module performs packet forwarding for incoming PPP frames and forwards IP data packets in the frames to the egress module for transmission on the packet switched network. Thus, for IP data traffic in the direction from the circuit switched network to the packet switched network, the LAC in the modem module strips off PPP headers, optionally performs data decompression or other processes on the data, and forwards encapsulated IP data packets directly to the egress module for transmission on the packet switched network. For data in the opposite direction, the egress module forwards IP data packets to the LAC in the modem module. The IP data packets are encapsulated with PPP headers, any required data compression is performed, and the PPP packets are transmitted over the PPP link to the remote terminal.

The tunneling protocol (e.g., L2TP), is thus a control mechanism for both distributed processing of the PPP, and control of distributed packet forwarding. This latter feature, distributed packet forwarding directly by the modem modules, is of particular significance in a high capacity network access server such as described herein. Whereas in the prior art IP data packet forwarding and routing for a single network access server chassis was typically performed in a single card or "blade" (i.e., one card served as a routing or gateway card for all the modems in the chassis), here the routing function is basically distributed to all the modem modules in the network access server, albeit with the route server performing routing control functions as set forth herein. The route server in the illustrated embodiment does not handle the actual IP data packet routing for the modems, rather it off-loads this function to the modem modules. The route server sends updated forwarding tables or information to the modem modules to assist in IP data packet routing, and also sends updated forwarding tables or information to the egress module to enable it to handle both the forwarded IP data packets, and the incoming IP data packets from the packet switched network.

While L2TP is the tunneling protocol used between the modem modules and the route server module in the illustrated embodiment, other tunneling protocols now known or later developed could of course be used, and the selection of a tunneling protocol is not particularly significant. Examples of other suitable tunneling protocols are the PPP Tunneling Protocol (PPTP) and Layer 2 Forwarding (L2F). L2TP was chosen in the illustrated embodiment because source code for implementing LAC and LNS functions in accordance with the L2TP protocol is known in the art or readily derived from RFC 2661, and does not require writing a new tunneling protocol from scratch. Thus, implementing the invention is very straightforward. The L2TP protocol is modified slightly to provide for distributed forwarding control messages between the route server module and the modem module to implement the distributed forwarding features of the invention.

In another aspect of the invention, a high efficiency, high capacity network access server is described in which Point-to-Point Protocol processing and packet forwarding functions are distributed among multiple computing platforms. The network access server includes an egress or interface module forming an interface to a packet switched network such as the Internet or a corporate backbone network. A plurality of modem modules are provided in the network access server, each of which are operatively connected to a circuit switched network (e.g., PSTN) so as to enable connections over the circuit switched network to the remote terminals.

Each of the modem modules comprises resident software and a computing platform together implementing a node for a tunneling protocol, such as a L2TP Access Concentrator function. The modem module further includes a distributed forwarding module performing IP or Internet Protocol Exchange (IPX) packet forwarding for incoming PPP frames, and forwarding the IP or IPX packets to the interface module.

The network access server further includes at least one route server comprising resident software and a computing platform for providing a peer to the modem tunneling node, such as a tunneling protocol network server function, e.g., an LNS. The route server module in the illustrated embodiment resides in a card or "blade" that is separate from the modem module, and separate from the egress or interface module. The route server module performs Internet IP or IPX routing and PPP control functions (e.g., negotiation, authentication) for PPP frames received from the remote terminals.

Further, the route server performs the tunneling node, IP routing and PPP control functions for a multitude of the modem modules. In a extremely high capacity network access server embodiment, there may be a large number of modem modules, more than one egress module, and perhaps two or even three route servers in the same chassis in order to further distribute the LNS tunneling functions and IP routing and PPP control functions among several route servers. However, in such an embodiment the IP data packet forwarding function is distributed to the modem modules, which transparently forward IP data packets directly to their assigned egress or interface module.

In yet another aspect of the invention, a method is provided for distributed protocol processing and IP data packet forwarding performed in a network access server. The method includes the steps of:
  a) receiving PPP negotiation packets at the modem module,
  b) tunneling the PPP negotiation packets to a route server in the network access server,
  c) performing at least one of Link Control Protocol (LCP), PPP link negotiation, PPP authentication, Internet Protocol Routing Information Protocol (IP RIP) and Internet Protocol Control Protocol (IPCP) processing for the PPP connection in the route server;
  d) the route server instructing the modem module to perform Internet Protocol (IP) data packet forwarding and providing forwarding information to the modem module;
  e) the modem module responsively stripping PPP headers from further incoming PPP packets and forwarding IP data packets contained therein directly to the egress interface module for transmission on the packet switched network.

These and other features of the invention will be more apparent from the following detailed description of a presently preferred embodiment of the invention.

BRIEF DESCRIPTION OF THE DRAWINGS

The following detailed description makes reference to the appended drawings, in which.

DETAILED DESCRIPTION OF THE PREFERRED EMBODIMENT OF THE INVENTION

Overview

Figure 1:
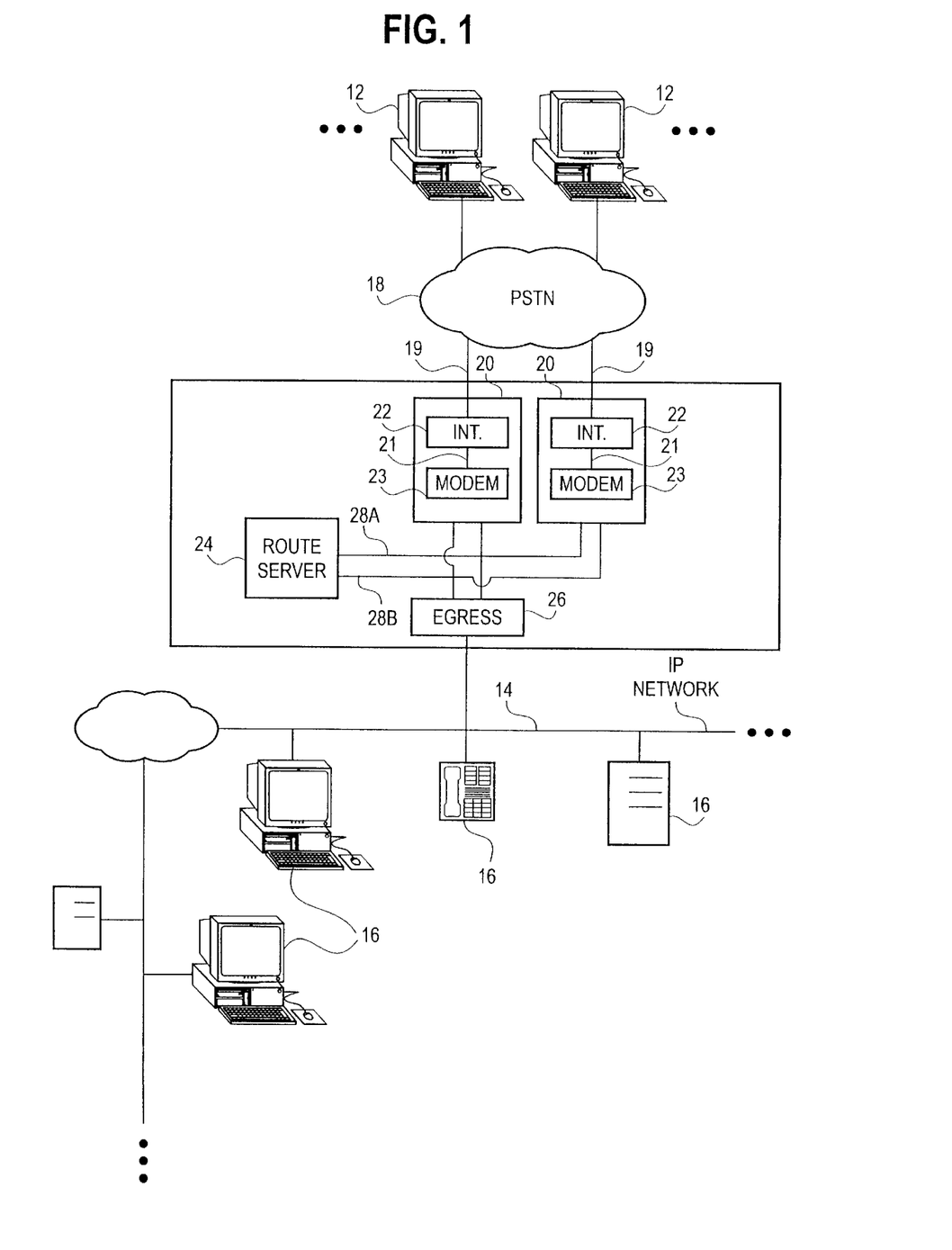
FIG. 1 is a block diagram of a network access server connecting remote terminals to a packet switched network, in which the network access server implements the distributed PPP processing and packet forwarding features of the invention.

Referring now to FIG. 1, a network access server 10 is illustrated connecting a plurality of remote terminals 12 to a packet switched network 14, such a corporate backbone network, Internet, or other type of network. Various types of computer terminals, multimedia servers, Internet telephony devices and other digital communications equipment 16 may be located on the packet switched network, the details of which are unimportant. Typically, the network 14 uses Internet Protocol (IP) as a packet addressing and routing protocol, but other types networks are contemplated as being with the scope of the invention, such as Internet Protocol Exchange (IPX) networks.

The remote terminals 12 dial in to the network access server 10 via a circuit switched network 18, which in the illustrated system is a Public Switched Telephone Network (PSTN). The incoming lines 19 are high speed multiplexed digital telephone lines, e.g., lines meeting DS-3 or T-3 service levels and operating at 44.736 Mbps. Each line 19 is the equivalent of 28 T-1 lines, each T-1 line comprising 24 multiplexed digital channels. Other types of networks are also contemplated, such as ADSL, ISDN, and wireless networks in which the remote terminals may be mobile wireless nodes such as personal digital assistants or laptop computers with cellular telephone modems. The details of the network 18 and the remote terminals 12 are not important.

Each remote terminal 12 establishes a Point-to-Point Protocol (PPP) connection with a PPP endpoint in the network access server 10 when the connection is made. That endpoint is typically a modem module in the network access server, however the processing of the PPP negotiations and other PPP control packets is off-loaded from the modems and distributed to a route server in the network access server as described herein. Furthermore, the function of forwarding of IP data packets contained in PPP frames from the remote terminals 12 is distributed to the modem module in the network access server, and not centralized in a gateway or routing card as was done in the prior art.

A tunneling mechanism, as described herein, is a vehicle for controlling or supervising this distributed processing and distributed routing in the network access server. The tunneling mechanism, and the distributed PPP processing and packet forwarding features it makes possible, enables the network access server 10 to operate at higher levels of efficiency than heretofore achieved. It allows the architecture of the network access server to be scaled to the point where it can serve thousands, and even tens of thousands, of remote terminals 12 simultaneously.

Still referring to FIG. 1, the network access server includes three separate processing modules which are used in the practice of the invention (other modules may be present in the network access server, such as management and power supply modules, but they are omitted for the sake of clarity in FIG. 1). First, there is an "ingress module" 20 which terminates PSTN connections. Several ingress modules 20 may be present in a network access server. The ingress module includes a DS-3 interface 22 to the PSTN lines 19. The interface 22 demultiplexes the incoming PSTN signal and recovers clock signals and DS-0 individual channel data. The DS-0 channel data is distributed over a time division multiplexed bus 21 to a modem module 23. The modem module 23 consists of a plurality of digital signal processors (DSPs) and associated circuitry (e.g., memory) which implement modem and signal conversion functions, one per channel, including data compression and decompression. The architecture for the interface module 22 and the modem modules is generally known to those skilled in the art or adaptable from the published patent literature, see e.g. Walsh et al., U.S. Pat. No. 5,528,595 and the high density modem description in published PCT patent application of 3Com Corporation, WO99/26387 dated May 27, 1999, the contents of which are incorporated by reference herein. The modem module 22 includes resident software and processing power (e.g., in the modem DSPs) that implement a tunneling protocol access concentrator function as described in more detail below.

Secondly, there is a route server 24 in the network access server. The route server 24 is incorporated into a separate card or "blade" inserted in the network access server chassis. The server contains a memory with resident software and a processing module for performing a tunneling protocol network server function as described in more detail below. The processing module and memory may consist of a general-purpose computing platform. Basically, the route server 24 performs the PPP control processing, including PPP link negotiation and PPP authentication, for the modems in the modem modules 23. Additionally, the route server performs IP network configuration for the PPP links and runs routing protocols over the PPP link. The actual IP data packet forwarding is performed directly by the modems modules 23, that is, they do not forward IP packets to the route server 24 for processing and routing, as that function is distributed, i.e. performed, by the individual modems in the modem modules 23.

Thirdly, there is an egress or interface module 26 that provides an interface to the packet switched network. The design and construction of an egress or interface module for a network access server is also well known in the art, commercially available from companies such as 3Com, and described in the patent and technical literature, see e.g. the above-cited patent to Walsh et al.

The modules 20, 24 and 26 are connected together by a high speed backplane or bus system 28. In the preferred embodiment, the bus system comprises two (2) Ethernet local area networks (LANs) 28A and 28B, each of which is Gigabit capable. One of the Ethernet LANs, 28A, is devoted to data transfer between various modules, principally between the modems modules 23 and the egress module 26. The other Ethernet LAN, 28B is a control network dedicated to exchanging management, signaling information and inter-module communications not directly involving transmission of IP data packets between the circuit switched and packet switched networks.

In the preferred embodiment, the egress module 26 includes a gigabit Ethernet switch which connects the internal data LAN 28A to the external packet switched network 14. The egress module 26 is also a Gigabit LAN Ethernet interface. To support high speed data transfer and provide scalability to the size contemplated with this invention, namely thousands or tens of thousands of simultaneous PPP connections, the IP data packets coming in over the PPP links need to be forwarded from the ingress modules 20 directly to the egress module 26, without going through other modules (such as the route server 24). The route server 24 controls routing related activity for the network access server as described in further detail below, but the actual routing is distributed to the modem modules 23 and the egress module 26. In effect, the route server 24 is the central control point for the distributed routing and packet forwarding of the system, but off-loads the packet forwarding intelligence to the modem modules 23 and the egress module 26 to allow them to perform the routing functions. Thus, the route server 24 does not pass data traffic through its interfaces to the network access server networks 28A and 28B.

Tunneling Feature for Distributed PPP Processing and IP Packet Forwarding

A tunneling procedure is provided in the network access server 10 to enable the distributed PPP processing and distributed routing functions of the invention. The tunneling procedure can be best understood by reference to FIG. 2, which shows the three basic modules of FIG. 1, modem, route server and egress, and their interrelationship to perform the tunneling and distributed processing and packet forwarding features of the invention.

Figure 2:
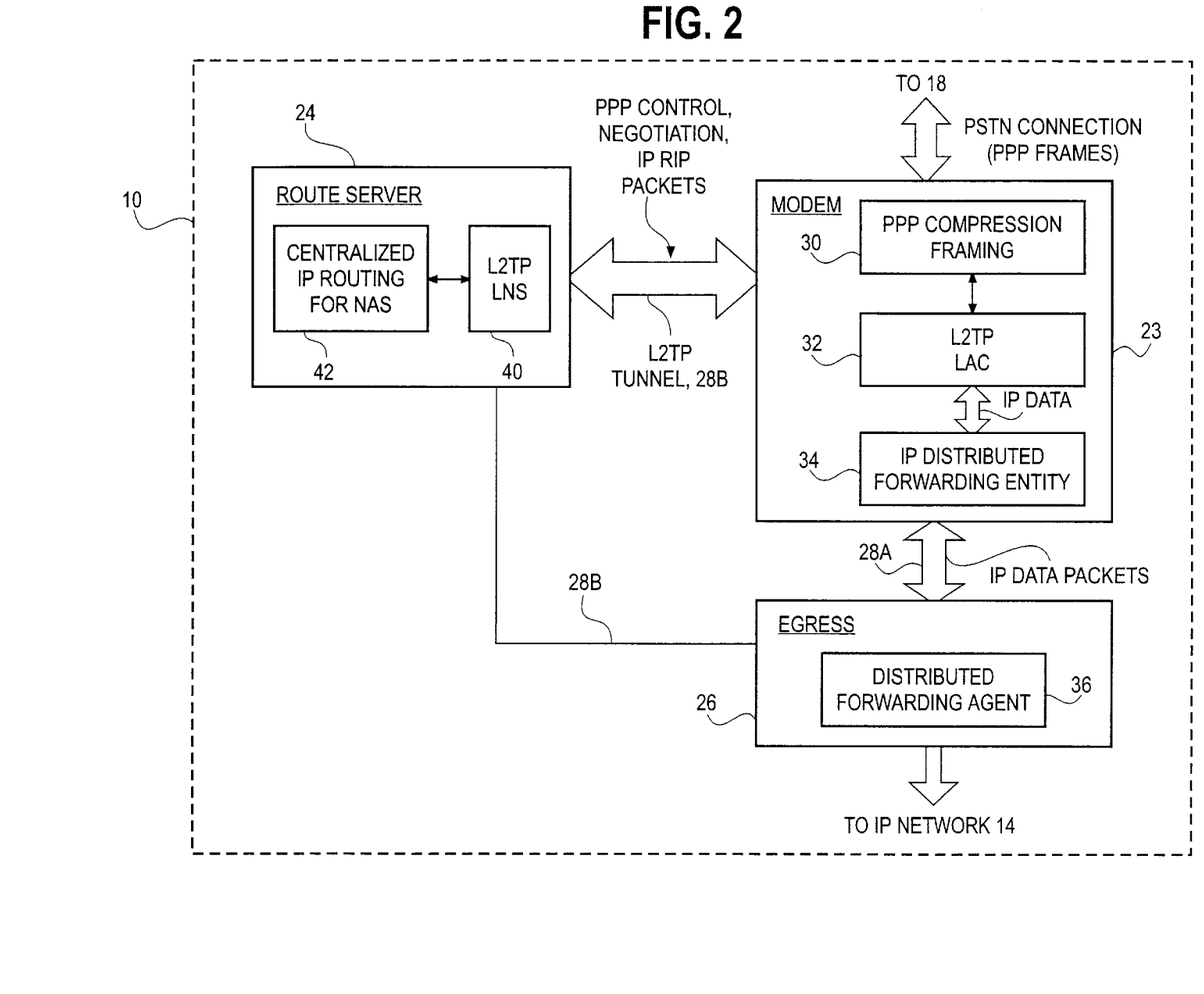
FIG. 2 is a more detailed block diagram of the modem module, route server module and a egress or interface module of FIG. 1, showing the L2TP tunnel endpoints.

The modem module 23 includes a DSP computing platform and resident software for performing data compression and PPP framing for outgoing data streams, and data decompression and stripping PPP headers for incoming PPP frames, as indicated at 30. The modem module 23 also includes a L2TP access concentrator function (LAC) indicated at 32, described in more detail below. IP packets contained in the incoming PPP frames are sent to an IP distributed forwarding entity or routine 34. The distributed forwarding entity 34 forwards IP data packets destined for the IP network 14 (FIG. 1) to the egress module 26. The module 26 includes a distributed forwarding agent function 36 which routes packets on the IP network 14 in accordance with routing instruction and information supplied to the Egress module 26 over the control LAN 28B.

The tunneling protocol node function indicated at 32 (L2TP LAC) is one end of an L2TP tunnel, and has a tunneling peer in the route server 24. In particular, the route server includes a tunneling protocol network server or L2TP LNS 40. The L2TP LAC 32 in the modem module and the L2TP LNS in the route server 24 together enable a logical tunnel between the modem module and route server, here an L2TP tunnel. As noted above, other tunneling protocols could be used, e.g., PPTP or L2F. The route server also includes a centralized IP (or IPX) routing function 42 for the modem module 24 (or a group of modem modules in the preferred embodiment). In particular, the route server performs Internet Protocol or Internet Protocol Exchange routing control functions, including processing of information contained in IP RIP frames from PSTN or the packet switched network 14. Routing information (e.g., routing table entries) are off-loaded to the modem modules 23, and in particular to the IP distributed forwarding entity 34, and to the distributing forwarding agent 36 in the egress module 26, to enable the actual routing of IP packets to the proper destination on the IP network 14 and in the opposite direction.

Thus, in response to instructions and routing information provided by the routing function 42 in the route server 24, the modems 23 perform IP data packet forwarding for incoming Point-to-Point Protocol frames and forward the IP data packets to the egress module 26 over the data LAN 28A for transmission on the packet switched network 14.

As noted in FIG. 2, the tunneling protocol node function 40 acts like a tunneling protocol network server function that instructs the LAC in the modem module 23 to forward IP or IPX data packets received from the circuit switched network 18 to the egress module 18. Additionally, the tunneling protocol network server function 40 provides instructions to the egress interface 26 regarding 1) the forwarding of IP data packets that it receives from the modem module and 2) where to forward incoming IP data packets that it receives from the packet switched network 14, namely which modem or modem module 23 to send the data packets to.

Additionally, some incoming PPP frames received from the PSTN may be destined for processing locally (as determined by the frame's destination IP address). Such PPP frames my may contain IP routing or IP RIP information that is needed by the route server 24, or management data needed by a management module in the chassis, etc. All PPP frames that are supposed to be terminated by another endpoint in the network access server are tunneled over the data LAN 28A to the route server 24 for processing and termination either there or elsewhere in the chassis.

When the remote terminal 12 initially dials in to the network access server 10, a PPP link needs to be negotiated between the remote terminal 12 and the network access server modem. In the illustrated embodiment, the modems in the modem module 23 initially tunnel all incoming Point-to-Point Protocol frames over the L2TP tunnel (via LAN 28A) to the route server 24 for PPP link negotiation. The route server 24, and in particular the LNS module 40, performs the PPP link negotiation. After the link has been negotiated and the PPP session established, the LNS module 40 sends a distributed forwarding control packet (basically a new type of message or extension to the L2TP protocol) to the modem module 23 instructing the LAC function 32 in the modem module to forward all incoming IP or IPX packets destined for the packet switched network 14 to the egress module 26.

The modem module 23 does some layer 3 and layer 4 processing of incoming PPP frames, and if additional PPP frames come in with PPP link control, routing control, management, or other types of control packets, they are tunneled to the route server 24 for processing or forwarding to the appropriate endpoint in the network access server. For all other types of frames, the modem module strips off PPP headers. The IP packets contained therein are directed over the data LAN 28A to the egress module 26.

In the reverse direction, IP packets received by the egress module from the IP network and destined for the remote terminal are switched onto the high speed data LAN 28 and directed to the proper modem in the modem module 23. PPP headers are prepended to the IP packets and the PPP frames are compressed, converted to signaling formats suitable for the circuit switched network 18 and transmitted over the time division multiplexed bus 21 to the circuit switched network interface module 22 for transmission on the PSTN network 18 to the remote terminal.

Thus, from the above description, it will be apparent that the modem modules have capabilities for PPP framing, L2TP LAC tunnel endpoint and packet forwarding. However, the modem modules do not have the capability of PPP negotiation, IP network configuration for PPP links, or running routing protocols over PPP links. That functionality is off-loaded to the route server 24 and the modem modules depend on the route server 24 to perform these functions. In this distributed processing scheme, the modem modules act as a modified L2TP LAC and the route server acts as a modified L2TP LNS to share the distributed processing. All PPP negotiation frames and routing packets will be tunneled from the modem module's LAC 32 to the route server LNS 40. Link Control Protocol (LCP), PPP authentication and IPCP control handling is performed by the route server.

After PPP link negotiation is complete, the route server will instruct the LAC 32 to forward data packets directly to the egress module 26. Two control extensions to the tunneling protocol are provided, one for this instruction (and appended routing tables), and another for a reply message or acknowledgment. Once the forwarding instruction is given to the modem module LAC 32, along with the necessary forwarding table entries, all data packets will be forwarded directly form the modem modules 23 to the egress module 26. During the session, the route server 24 will update information in the egress module 26 for handling the forwarded packets, and give it instructions to forwarding incoming packets from the IP network back to the modems.

For traffic in the direction from the circuit switched network to the packet switched network, the modems simply remove the PPP headers and do not attach any L2TP headers, i.e., "raw" IP packets are forwarded. If the PPP link has negotiated any compression, the modem LAC 323 will perform compression/decompression for the packets. For traffic in the opposite direction the modems prepend the PPP header, perform any negotiated compression, and forward the packet to DSP processing circuitry for required signal conversions, echo cancellation, etc. and send the data stream to the interface 22 for transmission on the digital telephone line 19 (FIG. 1).

Figure 3:
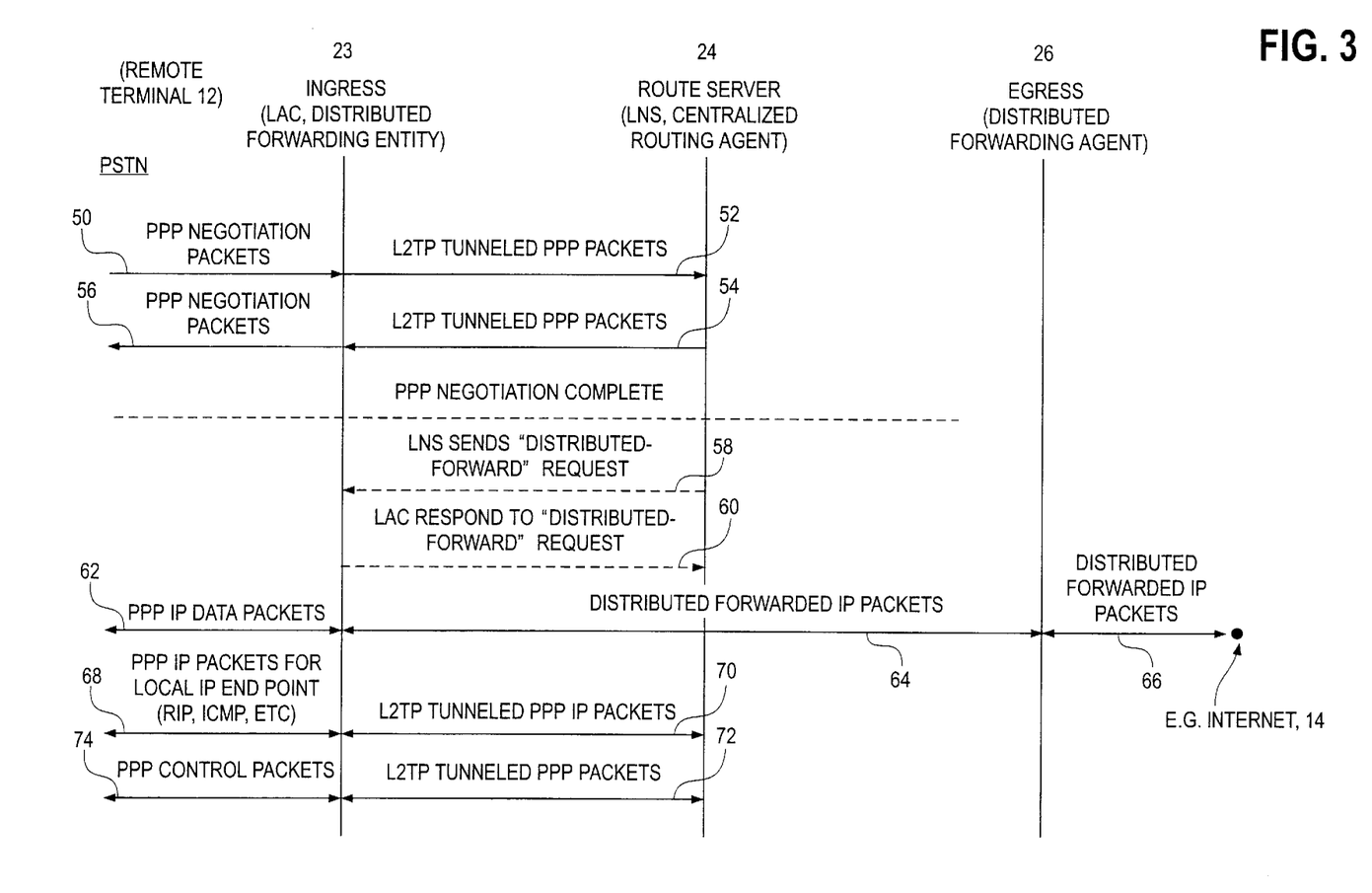
FIG. 3 is a diagram showing the flow of messages between the modem module, the route server and the interface module of FIG. 2 in a typical incoming call situation.

The above-described process is illustrated as a call flow diagram in FIG. 3. The remote terminal dials in to the network access server and sends PPP link negotiation packets to the LAC in the modem module, as indicated at 50. The packets are tunneled to the route server LNS, as indicated at 52. PPP link negotiation response packets are tunneled from the route server LNS to the modem LAC, as indicated at 54, and the packets are transmitted over the PSTN to the remote terminal at 56. This process continues until the PPP link negotiation is complete.

After the PPP link has been negotiated, the LNS sends a distributed forwarding request message 58 to the modem LAC. Basically, this message instructs the modem LAC to forward IP data packets directly to the egress module 26. The message is an extension to the L2TP protocol as defined in RFC 2661. The message is also accompanied by routing table information that the modem module's distributed forwarding entity needs to correctly route incoming IP packets from the PSTN to the egress module and packet switched network.

The modem module responds to the distributed forwarding request message 58 as indicated at 60. Ordinarily, this message is a simple acknowledgment message. The message may also indicate that the modem is unable to perform distributed forwarding functions, at which point the PPP connection may be transferred to another modem or another module, or other action may be taken.

Assuming that the message 60 was an affirmative acknowledgment, PPP frames containing IP packets are exchanged over the PSTN, as indicated at 62. The modem LAC strips off PPP headers for incoming frames and forwards raw IP data packets directly to the egress module 26's distributed forwarding agent over the data LAN 28A (FIG. 2), as indicated at 64, for switching onto the IP network 14 as indicated at 66. For IP traffic in the opposite direction, the distributed forwarding agent routes incoming IP traffic from the LAN 14 onto the data LAN 28A to the modem module 23. PPP headers are prepended onto the frames and the packets are transmitted over the PSTN to the remote terminal.

As indicated at 68 and 70, incoming PPP/IP packets intended for local IP endpoints in the network access server (such as packets containing IP RIP, Internet Control Message Protocol, management packets, etc.) are received at the modem module, passed directly to the modem module LAC, and tunneled to the LNS function 40 in the route server 24.

As indicated at 72 and 74, PPP control packets that are received by the modem LAC are tunneled to the route server LNS, and PPP control packets generated by the route server LNS are tunneled to the modem module LAC and transmitted over the PSTN to the remote terminal.

Figure 4:
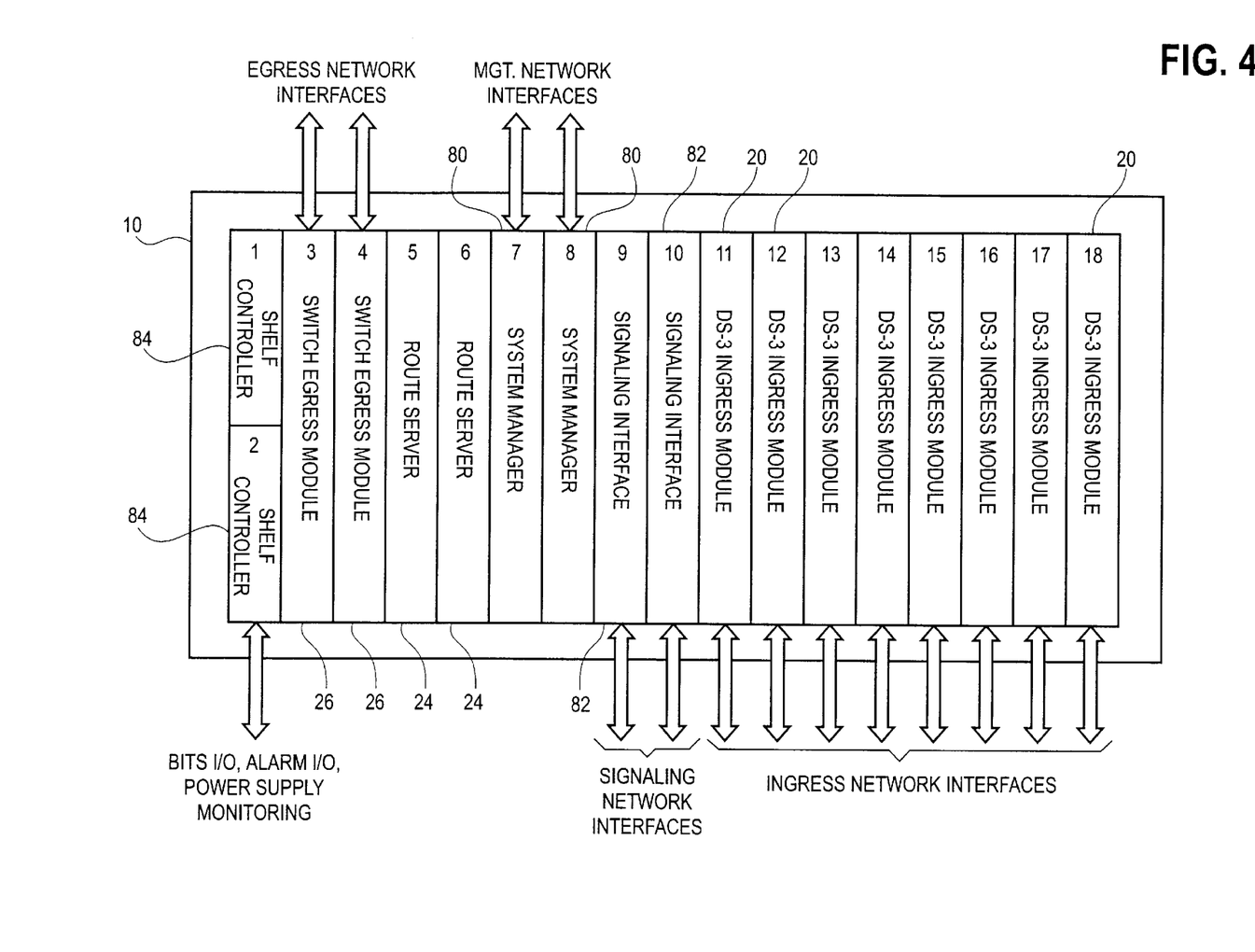
FIG. 4 is a block diagram of a high density network access server in which the invention can be implemented.

FIG. 4 is a block diagram of a high efficiency, high capacity network access server having Point-to-Point Protocol processing and packet forwarding functions distributed among multiple computing platforms. Basically, the embodiment of FIG. 4 is a larger scale version of the system of FIGS. 1 and 2. Some of the additional components or cards which may be present in an embodiment of the invention are also illustrated.

The network access server 10 includes two egress modules 26, each comprising a Gigabit capable Ethernet switch and interface to a packet switched network 14, e.g., the Internet. The egress modules are as described above.

The network access server also includes a plurality of DS-3 ingress modules 20, such as eight of such modules. Each ingress module includes an interface to the circuit switched network (PSTN) and a modem module as described above, each modem module including DSP circuitry providing one modem for each channel in the DS-3 line (e.g., 672 modems for a DS-3 line comprising 28 multiplexed T1 lines, each T1 line containing 24 DS-0 channels).

Each of the modem modules includes software and a computing platform implementing a tunneling protocol access concentrator function, i.e., L2TP LAC as described above, the tunneling protocol access concentrator function including a distributed forwarding module performing IP or IPX packet forwarding for incoming Point-to-Point Protocol frames and forwarding IP or IPX packets to one of the egress modules 26.

The network access server also includes two route servers 24 comprising software and a computing platform providing a tunneling protocol network server function. In the embodiment of FIG. 4, one route server 24 serves four of the modem modules and the other route server serves the other four modem modules. The tunneling protocol node network server function implemented in the route servers 24 comprises a peer to the tunneling protocol access concentrator function in the modem module. The tunneling protocol network server and access concentrator functions in the route server 24 and modem modules in the ingress modules 20, respectively, comprise endpoints of a logical tunnel between the modem modules and the route servers.

The route servers 24 perform IP or IPX routing and PPP control functions as indicated above. The task of forwarding IP data packets is distributed to the modem modules' LAC and distributed forwarding entity as described above.

The network access server also includes two system manager cards 80 which perform configuration and management functions for all the components in the chassis. The cards 80 have management network interfaces to an external management network. Two signaling interface cards 82 are provided for an interface between the network access server 10 and a signaling network, such as a SS7 network. The network access server also has two shelf controller cards 84 for local shelf control and power management allowing an external access to internal chassis functions such as alarm I/O, bits I/O and power supply monitoring. These details are not important to the invention and therefore further discussion of these details is omitted. The various modules illustrated in FIG. 4 are coupled together by data and control LANs as described above in conjunction with FIG. 1 (LANs 28A and 28B).

Since the embodiment of FIG. 4 has two route server cards 24, it would be possible to further distribute the processing of the PPP control functions and IP routing control functions among separate computing platforms in the route servers 24. Alternatively, one route server could be devoted to PPP control functions (negotiation, authentication, etc.) and the other devoted to IP routing control functions.

Figure 5:
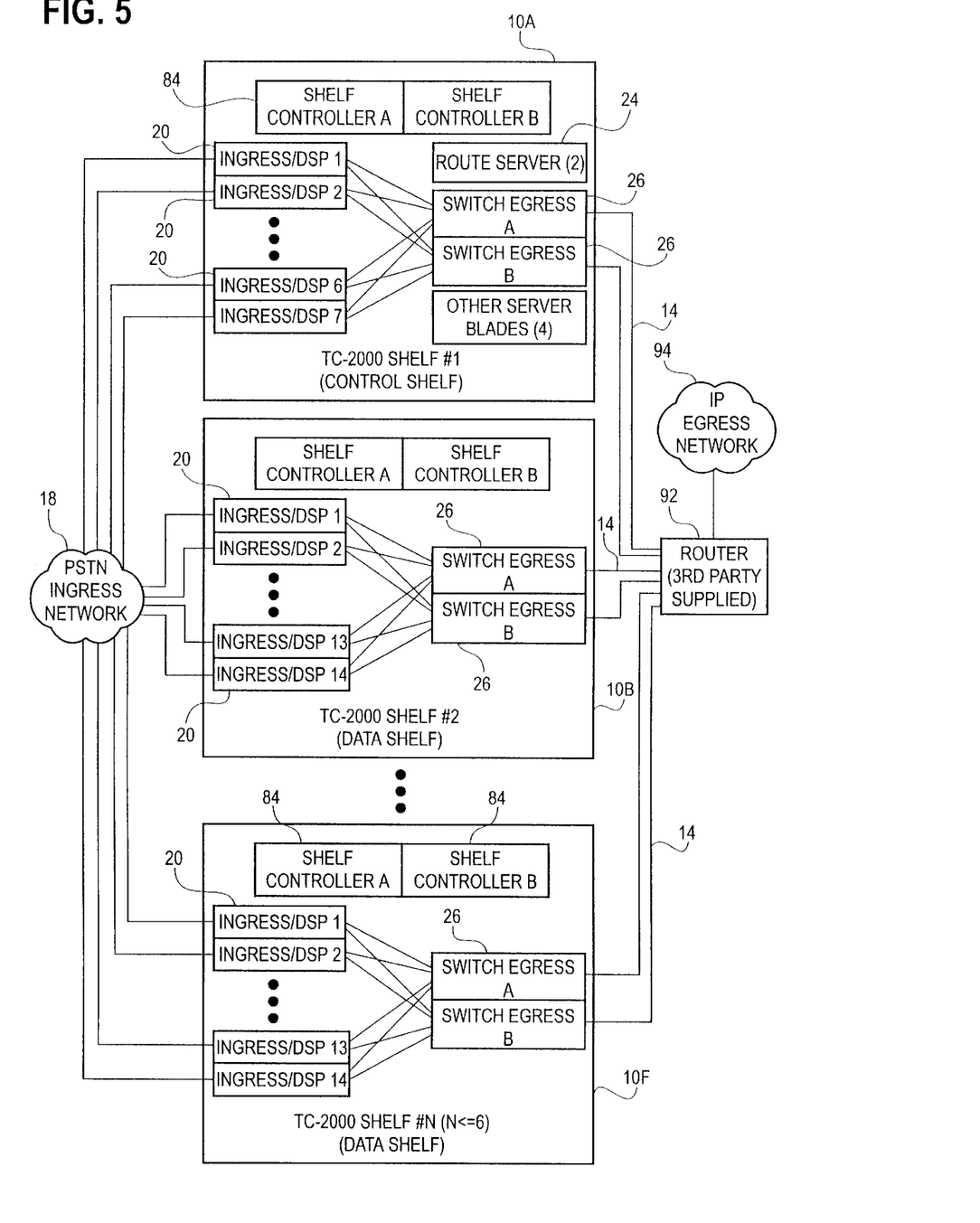
FIG. 5 is a block diagram of a system of N high density network access servers similar to that illustrated in FIG. 4, one of which is designated a control shelf implementing N route servers (one per network access servers in the system) and a plurality of modem modules. The remaining N-1 network access servers tunnel PPP control packets and IP routing packets to their assigned route server in the control shelf. Each of the N network access servers performs distributed routing as described in conjunction with FIGS. 1–3.

Remote Access System with Multiple Network Access Servers Performing Distributed PPP Processing and Packet Forwarding FIG. 5 is a block diagram of a system of N high density network access servers similar to that illustrated in FIG. 4. In the example of FIG. 5, N=6. One of the network access servers 10 is designated as a control shelf 10A, and incorporates 2 route server blades 24 (as described above) and 4 additional blades or modules such as for management or signaling, as described in FIG. 4. The control shelf or server 10A also includes a plurality of ingress modules 20, each including modem modules 23, and at least one egress module 26. All of the network access servers 10, 10A are connected to each other, such as over a local area network. The control shelf or server 10A performs management and SS7 signalling functions for all the shelfs in the system.

The remaining N-1 network access servers 10B, . . . 10F are basically data shelfs and identical to each other. They basically consist of a plurality of ingress modules 20 and enough egress modules 26 required to service the number of ingress modules that are in that server chassis. The N-1 network access servers tunnel PPP control packets and IP routing packets to their assigned route server 24 in the control shelf 10A over an external local area network 90 connecting the N network access servers together. Each of the N network access servers performs distributed routing as described in conjunction with FIGS. 1–3. In particular, IP packets are forwarded directly from the modem modules in the ingress modules to their assigned egress module over the data LAN in the chassis, for transmission on the packet switched network. The route servers 24 in the control shelf 10A serve as the tunnel endpoint for all of the modem modules in the system, and performs the IP routing and PPP control functions for the modems as described above in conjunction with FIGS. 1–4.

The system illustrated in FIG. 5 can handle approximately 30,000 simultaneous PPP sessions. This is possible because of the distributed processing of PPP control messages in the route servers and the distributed forwarding provided by the modem modules. The system can obviously be scaled beyond N=6, by providing even more route server cards in the control shelf 10A, and by providing more network access servers exclusively devoted to ingress and egress functions. Also, the size of the system is also dictated to some extent by the number of available slots for blades in the network access server chassis, but of course this can be scaled up to provide more slots than that indicated in FIG. 4 and FIG. 5.

IP data traffic from the various egress modules 26 in FIG. 5 is placed on a LAN 14 and directed to an external third party router 92. The router 92 directs all the IP traffic to the IP egress network 94, e.g., the Internet. In the embodiment of FIG. 5, all routing of IP traffic onto the egress network is performed by the router 92, further streamlining the function of the modem modules and egress cards and distributing the routing function completely outside of the N network access servers 10.

PPP MultiLink in a Distributed Processing Environment

The systems of FIG. 4 and FIG. 5 are suitable systems for implementing PPP Multilink protocol. The reader is directed to the patents of Kenneth L. Pierce, et al., U.S. Pat. Nos. 5,717,690, 5,878,040, and application Ser. No. 08/961,981, now allowed, issuing as U.S. Pat. No. 6,157,649, for a description of techniques for coordinating the assembly of PPP Multilink bundles in a termination unit (e.g., modem module). The contents of the Pierce et al. patents and application are incorporated by reference herein. In the embodiment of FIG. 5, the route servers in the control shelf supervise the redirection of packets from one modem module to the bundle owner (another modem module), which reassembles the packets and sends them to the egress module for transmission to the destination on the IP network 14.

Persons skilled in the art will appreciate that variation from the illustrated embodiments can be made without departure from the spirit and scope of the invention. This true spirit and scope will be found by reference to the appended claims. The generic descriptive term "route server" as used herein is intended to broadly refer to any processing module that performs the recited functions of a tunneling protocol node (e.g., LNS) as forth in the claims. Similarly, the terms "ingress module", "egress module", and "modem module" are intended to be interpreted broadly to modules, cards, or circuits that perform the functions of coupling the network access server to the circuit switched network, the packet switched network, and signal conversion, respectively. Further, while the route server may be physically embodied in a discrete integrated circuit card or "blade", as described herein and in the drawings, it may be physically incorporated into another card or blade that performs other functions, such as management functions.

What is claimed is:

1. A method of distributing protocol processing and packet forwarding in a network access server, said network access server providing simultaneous access to a packet switched network for a plurality of remote terminals connected to a communications network, said network access server comprising an egress module providing an interface to said packet switched network, comprising:
   a) providing a tunneling protocol node function in a modem module in said network access server,
   b) providing a distributed forwarding module in said modem module, and
   c) providing a tunneling protocol node function in a route server in said network access server as a peer to said tunneling protocol node function in said modem module, said tunneling protocol node functions in said modem and route server comprising endpoints of a logical tunnel between said modem module and said route server;
   d) wherein said modem module tunnels Internet Protocol or Internet Protocol Exchange routing and Point-to-Point Protocol control packets to said route server for processing by said route server; and
   e) wherein said distributed forwarding module performs packet forwarding for a plurality of incoming frames of data from said communications network and forwards data in said frames to said egress module for transmission on said packet switched network.

2. The method of claim 1, wherein said tunneling protocol node function in said route server comprises a tunneling protocol network server function instructing said tunneling protocol node function in said modem module to forward Internet Protocol or Internet Protocol Exchange data packets received from said communications network to said interface module.

3. The method of claim 2, wherein said tunneling network server function provides instructions to egress module regarding 1) the forwarding of Point-to-Point Protocol frames from said modem module and (2) forwarding incoming Point-to-Point Protocol frames from said packet switched network to said modem module.

4. The method of claim 1, wherein in said modem module comprises a high density modem module capable of handling at least 24 simultaneous Point-to-Point Protocol sessions.

5. The method of claim 1, wherein said tunneling protocol comprises a protocol selected from the group of tunneling protocols consisting of Layer 2 Tunneling Protocol, Point-to-Point Tunneling protocol (PPTP) and Layer 2 Forwarding (L2F).

6. The method of claim 1, wherein said modem module initially tunnels incoming Point-to-Point Protocol frames to said route server,
   and wherein said route server performs Point-to-Point Protocol link negotiation and sends a distributed forwarding control packet to said modem module instructing said tunneling protocol node function in said modem module to forward all incoming Internet Protocol or Internet Protocol Exchange packets destined for said packet switched network to said interface module.

7. The method of claim 1, wherein said tunneling protocol node function in said modem module forwards Internet Protocol packets for PPP local endpoint Internet Protocol addresses in said network access server to said route server.

8. The method of claim 1, wherein herein said network access server comprises a plurality of modem modules, and wherein said route server module controls the assembly of PPP multi-link bundles arriving at different modem modules in said network access server.

9. A high efficiency, high capacity network access server having Point-to-Point Protocol processing and packet forwarding functions distributed among multiple computing platforms, comprising:
   an egress module comprising an interface to a packet switched network;
   a plurality of modem modules, each operatively connected to a communications network;
   each of said modem modules further comprising software and a computing platform implementing a tunneling protocol access concentrator function, said tunneling protocol access concentrator function including a distributed forwarding module performing Internet Protocol or Internet Protocol Exchange packet forwarding for incoming Point-to-Point Protocol frames and forwarding said Internet Protocol or Internet Protocol Exchange packets to said interface module; and a route server comprising software and a computing platform providing a tunneling protocol network server function, said tunneling protocol network server function comprising a peer to said tunneling protocol access concentrator function in one of said modem modules, said tunneling protocol network server and access concentrator functions in said route server and modem module comprising endpoints of a logical tunnel between one of said modem modules and said route server;

said route server performing Internet Protocol or Internet Protocol Exchange routing and Point-to-Point Protocol control functions for said Point-to-Point protocol frames.

10. The network access server of claim 9, wherein said tunneling protocol network server function instructs said tunneling protocol access concentrator function in said modem module to forward Internet Protocol or Internet Protocol Exchange data packets received from said communications network to said interface module.

11. The network access server of claim 10, wherein said tunneling protocol network server function provides instructions to said egress module regarding (1) the forwarding of Point-to-Point Protocol frames from one of said modem modules and (2) forwarding incoming Point-to-Point Protocol frames from said packet switched network to one of said modem modules.

12. The network access server of claim 9, wherein in one of said modem modules comprises a high density modem module capable of handling at least 24 simultaneous Point-to-Point Protocol sessions.

13. The network access server of claim 9, wherein said tunneling protocol comprises a protocol selected from the group of tunneling protocols consisting of Layer 2 Tunneling Protocol, Point-to-Point Tunneling protocol (PPTP) and Layer 2 Forwarding (L2F).

14. The network access server of claim 9, wherein one of said modem modules initially tunnels incoming Point-to-Point Protocol frames to said route server, and wherein said route server performs Point-to-Point Protocol link negotiation and sends a distributed forwarding control packet to one of said modem modules instructing said tunneling protocol access concentrator function in one of said modem modules to forward all incoming Internet Protocol packets destined for said packet switched network to said egress module.

15. The network access server of claim 9, wherein said tunneling protocol access concentrator function forwards Internet Protocol packets for PPP local endpoint Internet Protocol addresses in said network access server to said route server.

16. The network access server of claim 9, wherein said route server further distributes the processing of Point-to-Point Protocol control functions and Routing Information Protocol among two separate computing platforms in said route server.

17. A method of distributed protocol processing and Internet Protocol data packet forwarding performed in a network access server, said network access server comprising at least one modem module and an interface to a packet switched network, comprising the steps of:

receiving Point-to-Point Protocol (PPP) negotiation packets at said at least one modem module;

tunneling said PPP negotiation packets to a route server in said network access server;

performing at least one of Link Control Protocol (LCP), PPP link negotiation, PPP authentication, Internet Protocol Routing Information Protocol (IP RIP) and Internet Protocol Control Protocol (IPCP) processing in said route server;

said route server module instructing said modem module to perform IP data packet forwarding and providing forwarding information to said at least one modem module;

said modem module responsively stripping PPP headers from further incoming PPP packets and forwarding IP data packet contained therein directly to said interface for transmission on said packet switched network.

18. The method of claim 17, further comprising the step of said at least one modem module inspecting layer 3 or layer 4 fields of said Internet Protocol data packet to differentiate between packets to be sent to said route server and packets to be forwarded to said interface.

19. The method of claim 17, wherein said modem module tunnels PPP control packets and IP Routing Information Protocol (RIP) control packets to said route server module.

20. The method of claim 17, wherein said network access server comprises a plurality of modem modules, and wherein said route server module controls the assembly of PPP multi-link bundles arriving at different modem modules in said network access server.

21. The method of claim 17 wherein said tunneling is performed in accordance with a tunneling protocol selected from the group of tunneling protocols consisting of Layer 2 Tunneling Protocol, Point-to-Point Tunneling protocol (PPTP) and Layer 2 Forwarding (L2F).

* * * * *